Sept. 27, 1949.                    W. J. HERGNER                    2,483,048
                          SAFETY BRAKE OR ROUGH LOCK
Filed Sept. 11, 1945                                             2 Sheets-Sheet 1
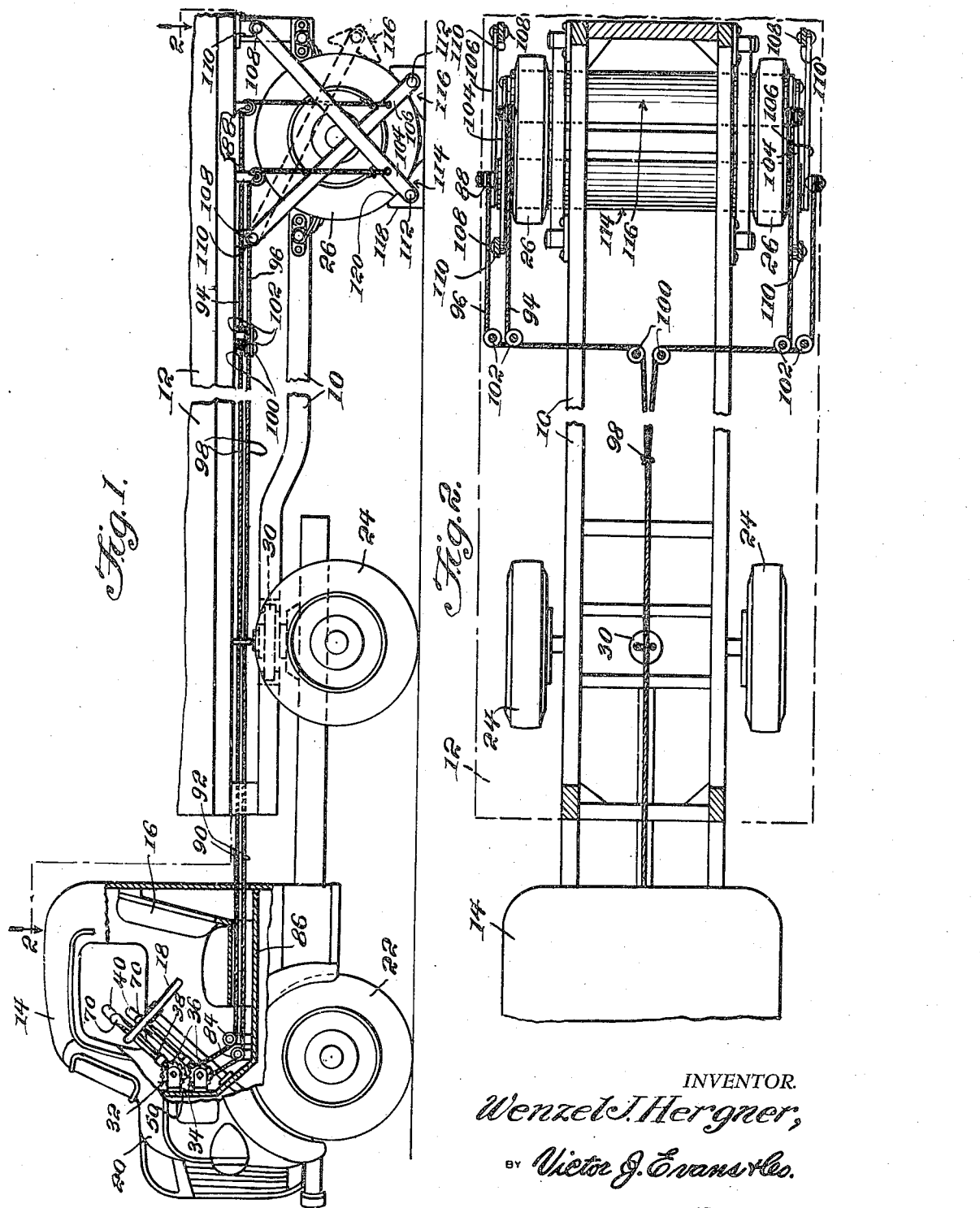
INVENTOR.
Wenzel J. Hergner,
BY Victor J. Evans & Co.
ATTORNEYS

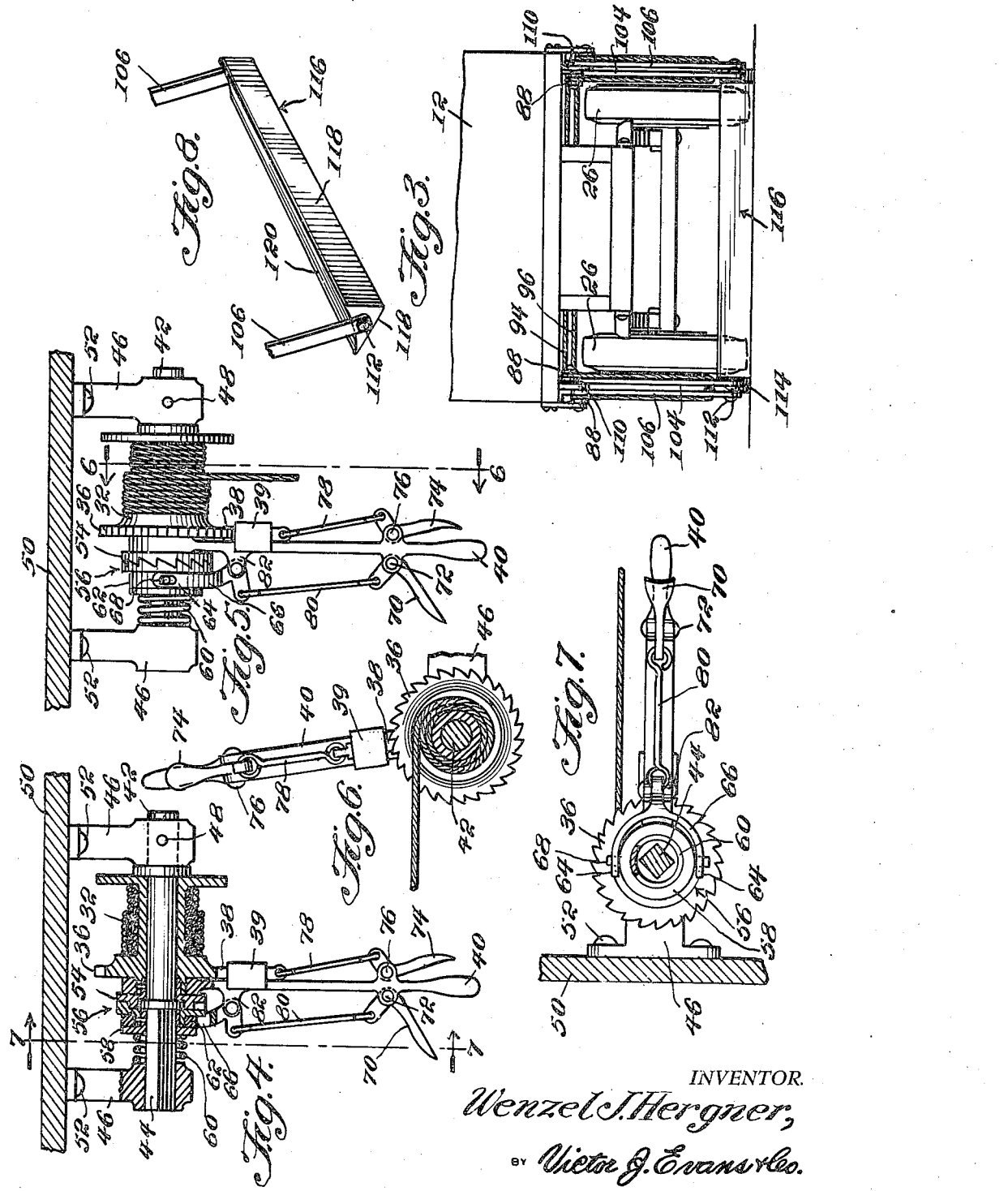

Patented Sept. 27, 1949

2,483,048

UNITED STATES PATENT OFFICE 2,483,048

SAFETY BRAKE OR ROUGH LOCK

Wenzel J. Hergner, McKeesport, Pa.

Application September 11, 1945, Serial No. 615,577

2 Claims. (Cl. 188—4)

My present invention, in its broad aspect, has to do with safety or emergency brakes or "rough-locks" for trucks, and other wheeled vehicles, and is especially indicated for use with heavily loaded trucks or the like on hills, or elsewhere where possible accidental or unintended movement of the motor vehicle either forward or backward might occur due to slipping or failure of the conventional brakes. More particularly, it is my purpose to provide improved wedging blocks, and supports and operating means for the same, whereby the wheels of the vehicle may be wedged and blocked either in front or in back, or both front and in back, thereby to effectively block the wheels against any movement whether the vehicle is on a hill or elsewhere.

Other and important objects of my invention are: (1) to provide a cable, drum, and leverage action with a dog and ratchet actuating mechanism for applying and releasing the brake in the most effective and practical manner, (2) to provide a clutch associated with said drum operated by leverage action to retain the drum in fixed relation to a shaft on which said drum and said clutch are mounted, and (3) to provide a sturdy, simple and efficient device which may be installed on conventional trucks, and other wheeled and powered vehicles without change in structure or excessive labor and cost.

Additional objects and advantages will be apparent from the following description and drawings, but in that connection, it is to be understood that changes in size, form, shape, construction, and arrangement of parts may be made without departing from the spirit of my invention, or the scope of the appended claims.

In the drawings wherein I have illustrated a preferred form of my invention:

Figure 1 is a diagrammatic view of a truck with by invention applied;

Figure 2 is a top plan view thereof;

Figure 3 is a rear end view of the rear wheels with the invention in braking position;

Figure 4 is a sectional view of the dog and ratchet, and clutch operating mechanism for the drum;

Figure 5 is a full view of Figure 4;

Figure 6 is a sectional view on line 6—6 of Figure 5 with the lever in raised position;

Figure 7 is a sectional view on the line 7—7 of Figure 4, and

Figure 8 is a perspective view of one of the brake blocks.

In the drawings wherein like characters of reference are used to designate like or similar parts:

The numeral 10 designates the longitudinal side rails of a truck-trailer chassis, on which is the body 12, cab 14, driver's seat 16, steering wheel 18, hood 20, front wheels 22, intermediate wheels 24, trailer wheels 26 and connection 30 between the trailer body and truck.

Mounted conveniently to the driver are rotatable drums 32 and 34 each carrying a ratchet 36, a dog 38, having the spring latch 39 and operating lever 40 for each dog. The drums may be spaced one above the other and mounted on the dashboard 50 as shown in Figure 1, with the ratchet levers 40 convenient to the driver. The drums 32 and 34 are rotatably mounted on the shaft 42 having the squared portion 44 and both ends of the shaft are fixed in bearings 46, the round end by a pin 48 and the square portion in the square opening with the bearings. The bearings are fixed to the dashboard 50 by bolts 52. The fixed clutch elements 54 of the clutches 56 are fixed to the drums 32 and 34 and rotate therewith. The movable clutch elements 58 of the clutches 56 are mounted on the squared portion 44 of the shaft 42. Therefore when the clutch elements are engaged the drums 32 and 34 are prevented from rotating on the shaft 42. Springs 60 mounted on the shafts 42 intermediate the movable clutch elements 58 and the bearings 46 abut the elements 58 and force the clutches into engaged position at all times.

Disengagement of the clutches 56 is obtained by collars 62 loosely mounted on the elements 58 which are actuated by means of the forked ends 64 of the yokes 66 co-acting with the pins 68 fixed in the collars 62.

The handles 70, pivotally mounted on the levers 40 at 72, are diametrically opposite the handles 74, pivotally mounted on the levers 40 at 76 that actuate the dogs 38 by rods 78. The handles actuate the yokes 66 by rods 80, the yokes 66 being pivotally mounted on the levers 40 by arms 82. A pair of idler pulleys 84 are located on the floor board 86 and another pair of idler pulleys 88 over the rear wheels and spaced apart longitudinally to be in front and back of the rear wheel axle. Cables 90 and 92 lead from drums 32 and 34 over their respective pulleys 84 to the cables 94 and 96 respectively where they are joined to these cables at 98, the cables 94 and 96 then pass over pulleys 100 and 102, and pulleys 88 and engage angularly depending crossed arms 104 and 106 which are pivoted at their upper ends by bolts 108 in brackets 110 secured on the chassis and cross each other at about in line with the hub of the rear wheel, and extend to a point near the ground in front and in back of the rear wheel or trailer wheels 26. The cables 94 and 96 engage the arms near their ends, and each arm pivotally engages an end of a wedge block 114 at 112. There are two wedge blocks 114 and 116, and as shown in Figure 1, there are crossed arms 104 and 106 at each side of the vehicle, the wedge blocks being engaged by an arm at each end. Each wedge block has two plane faces at right angles to each other designated at 118, and an arcuate face 120 between the ends of the two to receive the tread of a tire to slightly elevate the wheel from the ground.

In operation, the arms 104 and 106 are raised by rotating drums 32 and 34 by means of the levers 40 actuating the ratchet 36 by means of the dogs 38. The clutch elements 54 and 58 will slip past each other during the rotation of the drum and when the blocks are in full raised position, the clutches 56 will lock the drum and prevent further rotation or unwinding thereof.

To position the blocks 114 and 116, the handles 70 and 74 are depressed disengaging the dog and yoke permitting the blocks to fall into place by gravity under the tread as shown in Figure 1 to block the vehicle.

From the foregoing, it is believed the operation and advantages of my invention will be apparent but interpretation of the scope thereof should only be conclusive when made in the light of the subjoined claims.

I claim:

1. In a safety brake for a wheeled vehicle, a first pair of arms arranged in criss-cross relation with respect to each other and having their upper ends pivotally connected to said vehicle, a second pair of arms arranged in criss-cross relation with respect to each other and having their upper ends pivotally connected to said vehicle, said first and second pairs of arms being spaced from each other and arranged in embracing relation with respect to the wheels of said vehicle, a pair of horizontally-disposed spaced wedge blocks extending between said arms and secured to the latter and mounted for movement into and out of frictional engagement with respect to the wheels, and manually-operable means operatively connected to said arms for causing pivotal movement of the latter to thereby move said wedge blocks into and out of engagement with said wheels.

2. In a safety brake for a wheeled vehicle, a first pair of arms arranged in criss-cross relation with respect to each other and having their upper ends pivotally connected to said vehicle, a second pair of arms arranged in criss-cross relation with respect to each other and having their upper ends pivotally connected to said vehicle, said first and second pairs of arms being spaced from each other and arranged in embracing relation with respect to the wheels of said vehicle, a pair of horizontally-disposed spaced wedge blocks extending between said arms and secured to the latter and mounted for movement into and out of frictional engagement with respect to the wheels, manually-operable means operatively connected to said arms for causing pivotal movement of the latter to thereby move said wedge blocks into and out of engagement with said wheels, and means mounted in said vehicle for maintaining said wedge blocks out of engagement with said wheels.

WENZEL J. HERGNER.

REFERENCES CITED

The following references are of record in the file of this patent:

UNITED STATES PATENTS

| Number | Name | Date |
|---|---|---|
| 2,182,044 | Ackerman | Dec. 5, 1939 |

FOREIGN PATENTS

| Number | Country | Date |
|---|---|---|
| 25,230 | Great Britain | 1898 |
| 35,793 | Switzerland | Jan. 26, 1906 |